(12) United States Patent
Besehanic

(10) Patent No.: US 9,124,920 B2
(45) Date of Patent: Sep. 1, 2015

(54) METHODS, APPARATUS, AND ARTICLES OF MANUFACTURE TO IDENTIFY MEDIA PRESENTATION DEVICES

(75) Inventor: Jan Besehanic, Tampa, FL (US)

(73) Assignee: THE NIELSON COMPANY (US), LLC, Schaumburg, IL (US)

( * ) Notice: Subject to any disclaimer, the term of this patent is extended or adjusted under 35 U.S.C. 154(b) by 564 days.

(21) Appl. No.: 13/172,550

(22) Filed: Jun. 29, 2011

(65) Prior Publication Data

US 2013/0007236 A1   Jan. 3, 2013

(51) Int. Cl.
| | | |
|---|---|---|
| G06F 15/173 | (2006.01) | |
| H04N 21/426 | (2011.01) | |
| H04N 21/258 | (2011.01) | |
| H04N 21/436 | (2011.01) | |
| H04N 21/442 | (2011.01) | |
| H04N 21/8352 | (2011.01) | |

(52) U.S. Cl.
CPC ... *H04N 21/42684* (2013.01); *H04N 21/25891* (2013.01); *H04N 21/436* (2013.01); *H04N 21/44222* (2013.01); *H04N 21/8352* (2013.01)

(58) Field of Classification Search
CPC  H04L 29/00; H04L 41/0213; H04N 21/8352; G06F 15/173
USPC .......................... 709/223; 705/14.44; 370/392
See application file for complete search history.

(56) References Cited

U.S. PATENT DOCUMENTS

| | | |
|---|---|---|
| 5,481,294 A | 1/1996 | Thomas et al. |
| 5,497,185 A | 3/1996 | Dufresne et al. |
| 5,526,427 A | 6/1996 | Thomas et al. |
| 5,550,928 A | 8/1996 | Lu et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,732,218 A | 3/1998 | Bland et al. |
| 5,737,025 A | 4/1998 | Dougherty et al. |
| 5,737,026 A | 4/1998 | Lu et al. |

(Continued)

FOREIGN PATENT DOCUMENTS

| | | |
|---|---|---|
| CN | 101605030 | 12/2009 |
| CN | 102377616 | 3/2012 |

(Continued)

OTHER PUBLICATIONS

Erman et al., "HTTP in the Home: It is not just about PCs," HomeNets 2010, Sep. 3, 2010, New Dehli, India, (6 pages).

(Continued)

*Primary Examiner* — Razu Miah
(74) *Attorney, Agent, or Firm* — Hanley, Flight & Zimmerman, LLC

(57) ABSTRACT

Methods, apparatus, and articles of manufacture to identify media presentation devices are disclosed. A disclosed example method to identify a media presentation device includes intercepting, using a processor in communication with a local network, a data packet comprising a source identification, the data packet being addressed to a destination in a wide area network and originating from a media presentation device in the local network, identifying a device type of the media presentation device based on the source identification, and storing the device type and an indication of media exposure.

17 Claims, 9 Drawing Sheets

(56) References Cited

U.S. PATENT DOCUMENTS

| | | | |
|---|---|---|---|
| 5,771,307 A | 6/1998 | Lu et al. | |
| 5,787,253 A | 7/1998 | McCreery et al. | |
| 5,802,320 A * | 9/1998 | Baehr et al. | 709/249 |
| 5,848,396 A | 12/1998 | Gerace | |
| 5,850,249 A | 12/1998 | Massetti et al. | |
| 5,855,020 A | 12/1998 | Kirsch | |
| 5,889,548 A | 3/1999 | Chan | |
| 5,905,713 A | 5/1999 | Anderson et al. | |
| 5,961,593 A | 10/1999 | Gabber et al. | |
| 5,970,469 A | 10/1999 | Scroggie et al. | |
| 5,991,735 A | 11/1999 | Gerace | |
| 6,026,368 A | 2/2000 | Brown et al. | |
| 6,052,730 A | 4/2000 | Felciano et al. | |
| 6,055,573 A | 4/2000 | Gardenswartz et al. | |
| 6,070,145 A | 5/2000 | Pinsley et al. | |
| 6,070,148 A | 5/2000 | Mori et al. | |
| 6,081,900 A | 6/2000 | Subramaniam et al. | |
| 6,108,637 A * | 8/2000 | Blumenau | 715/204 |
| 6,115,680 A | 9/2000 | Coffee et al. | |
| 6,128,624 A | 10/2000 | Papierniak et al. | |
| 6,138,162 A | 10/2000 | Pistriotto et al. | |
| 6,138,165 A | 10/2000 | Nakatsugawa | |
| 6,141,686 A | 10/2000 | Jackowski et al. | |
| 6,286,043 B1 | 9/2001 | Cuomo et al. | |
| 6,286,046 B1 | 9/2001 | Bryant | |
| 6,321,336 B1 | 11/2001 | Applegate et al. | |
| 6,351,467 B1 | 2/2002 | Dillon | |
| 6,353,929 B1 | 3/2002 | Houston | |
| 6,381,632 B1 | 4/2002 | Lowell | |
| 6,421,733 B1 | 7/2002 | Tso et al. | |
| 6,449,251 B1 | 9/2002 | Awadallah et al. | |
| 6,487,538 B1 | 11/2002 | Gupta et al. | |
| 6,507,589 B1 | 1/2003 | Ramasubramani et al. | |
| 6,567,857 B1 | 5/2003 | Gupta et al. | |
| 6,606,581 B1 | 8/2003 | Nickerson et al. | |
| 6,658,414 B2 | 12/2003 | Bryan et al. | |
| 6,704,787 B1 | 3/2004 | Umbreit | |
| 6,732,118 B2 | 5/2004 | Hermann et al. | |
| 6,834,308 B1 | 12/2004 | Ikezoye et al. | |
| 6,839,680 B1 | 1/2005 | Liu et al. | |
| 6,856,963 B1 | 2/2005 | Hurwitz | |
| 6,993,590 B1 | 1/2006 | Gauthier et al. | |
| 7,039,599 B2 | 5/2006 | Merriman et al. | |
| 7,039,858 B2 * | 5/2006 | Humpleman et al. | 715/205 |
| 7,080,077 B2 | 7/2006 | Ramamurthy et al. | |
| 7,092,926 B2 | 8/2006 | Cerrato | |
| 7,092,942 B2 | 8/2006 | Frieden et al. | |
| 7,159,023 B2 | 1/2007 | Tufts | |
| 7,181,412 B1 | 2/2007 | Fulgoni et al. | |
| 7,200,632 B1 | 4/2007 | Greschler et al. | |
| 7,216,149 B1 | 5/2007 | Briscoe et al. | |
| 7,260,837 B2 | 8/2007 | Abraham et al. | |
| 7,269,591 B2 | 9/2007 | Wesinger, Jr. et al. | |
| 7,366,724 B2 | 4/2008 | Frieden et al. | |
| 7,373,415 B1 | 5/2008 | DeShan et al. | |
| 7,375,641 B2 | 5/2008 | Kiel et al. | |
| 7,376,722 B1 | 5/2008 | Sim et al. | |
| 7,420,464 B2 | 9/2008 | Fitzgerald et al. | |
| 7,421,723 B2 | 9/2008 | Harkness et al. | |
| 7,483,975 B2 | 1/2009 | Kolessar et al. | |
| 7,515,587 B2 | 4/2009 | Timperman et al. | |
| 7,613,809 B2 | 11/2009 | Jackson et al. | |
| 7,688,813 B2 | 3/2010 | Shin et al. | |
| 7,702,317 B2 | 4/2010 | Montelius | |
| 7,814,483 B2 | 10/2010 | Li et al. | |
| 7,849,502 B1 | 12/2010 | Bloch et al. | |
| 8,185,640 B2 * | 5/2012 | Nag et al. | 709/228 |
| 8,224,982 B2 * | 7/2012 | Langille | 709/232 |
| 8,594,617 B2 | 11/2013 | Papakostas et al. | |
| 8,886,773 B2 * | 11/2014 | Papakostas et al. | 709/220 |
| 8,910,259 B2 | 12/2014 | Papakostas et al. | |
| 2001/0014915 A1 | 8/2001 | Blumenau | |
| 2001/0020242 A1 | 9/2001 | Gupta et al. | |
| 2001/0039578 A1 * | 11/2001 | Tokumaru et al. | 709/223 |
| 2002/0032734 A1 | 3/2002 | Rhoads | |
| 2002/0065802 A1 | 5/2002 | Uchiyama | |
| 2002/0069368 A1 | 6/2002 | Hines | |
| 2002/0078441 A1 | 6/2002 | Drake et al. | |
| 2002/0116523 A1 | 8/2002 | Warrier et al. | |
| 2002/0128803 A1 | 9/2002 | Skinner et al. | |
| 2002/0169830 A1 | 11/2002 | Mild et al. | |
| 2002/0169835 A1 | 11/2002 | Paul, Jr. et al. | |
| 2002/0178257 A1 | 11/2002 | Cerrato | |
| 2003/0009762 A1 | 1/2003 | Hooper et al. | |
| 2003/0018778 A1 | 1/2003 | Martin et al. | |
| 2003/0033432 A1 * | 2/2003 | Simpson et al. | 709/246 |
| 2003/0035409 A1 | 2/2003 | Wang et al. | |
| 2003/0051052 A1 | 3/2003 | Shteyn et al. | |
| 2003/0065595 A1 | 4/2003 | Anglum | |
| 2003/0091025 A1 | 5/2003 | Celi Jr. et al. | |
| 2003/0115586 A1 * | 6/2003 | Lejouan et al. | 725/9 |
| 2003/0154306 A1 | 8/2003 | Perry | |
| 2003/0195884 A1 | 10/2003 | Boyd et al. | |
| 2004/0044786 A1 * | 3/2004 | Basso et al. | 709/238 |
| 2004/0133687 A1 | 7/2004 | Yamaguchi et al. | |
| 2004/0205159 A1 | 10/2004 | Johnson et al. | |
| 2004/0225728 A1 * | 11/2004 | Huggins et al. | 709/223 |
| 2005/0021603 A1 | 1/2005 | Yokomitsu et al. | |
| 2005/0108539 A1 | 5/2005 | Skog et al. | |
| 2005/0122976 A1 * | 6/2005 | Poli et al. | 370/392 |
| 2005/0138192 A1 | 6/2005 | Encarnacion et al. | |
| 2005/0198261 A1 | 9/2005 | Durvasula et al. | |
| 2005/0201357 A1 | 9/2005 | Poyhonen | |
| 2006/0053110 A1 | 3/2006 | McDonald et al. | |
| 2006/0264202 A1 | 11/2006 | Hagmeier et al. | |
| 2006/0271677 A1 * | 11/2006 | Mercier | 709/224 |
| 2007/0147261 A1 * | 6/2007 | Schumacher et al. | 370/248 |
| 2007/0214501 A1 | 9/2007 | Muramoto et al. | |
| 2007/0222598 A1 | 9/2007 | Kiel et al. | |
| 2007/0273505 A1 | 11/2007 | Brosius | |
| 2008/0015929 A1 | 1/2008 | Koeppel et al. | |
| 2008/0056261 A1 | 3/2008 | Osborn et al. | |
| 2008/0228906 A1 * | 9/2008 | Yerubandi et al. | 709/223 |
| 2008/0244050 A1 * | 10/2008 | Wong et al. | 709/223 |
| 2008/0281697 A1 | 11/2008 | Whitehead | |
| 2008/0289010 A1 | 11/2008 | Frieden et al. | |
| 2009/0034536 A1 | 2/2009 | Morand et al. | |
| 2009/0100174 A1 * | 4/2009 | Annareddy et al. | 709/224 |
| 2009/0119401 A1 | 5/2009 | Oikawa et al. | |
| 2009/0144410 A1 * | 6/2009 | Fink et al. | 709/224 |
| 2009/0192870 A1 | 7/2009 | White et al. | |
| 2009/0198778 A1 * | 8/2009 | Priebe | 709/206 |
| 2009/0233633 A1 | 9/2009 | Morrison | |
| 2009/0282471 A1 | 11/2009 | Green et al. | |
| 2010/0005183 A1 * | 1/2010 | Ding et al. | 709/229 |
| 2010/0036969 A1 | 2/2010 | Perry et al. | |
| 2010/0083338 A1 * | 4/2010 | Chiang | 725/139 |
| 2010/0192187 A1 | 7/2010 | Toebes et al. | |
| 2010/0205675 A1 * | 8/2010 | Vogel et al. | 726/25 |
| 2010/0216434 A1 | 8/2010 | Marcellino et al. | |
| 2010/0293610 A1 * | 11/2010 | Beachem et al. | 726/15 |
| 2010/0325238 A1 * | 12/2010 | Khedouri et al. | 709/217 |
| 2010/0325239 A1 * | 12/2010 | Khedouri et al. | 709/217 |
| 2012/0042005 A1 | 2/2012 | Papakostas et al. | |
| 2012/0042367 A1 | 2/2012 | Papakostas et al. | |
| 2013/0005296 A1 | 1/2013 | Papakostas et al. | |

FOREIGN PATENT DOCUMENTS

| | | |
|---|---|---|
| EP | 1980950 | 10/2008 |
| EP | 2341437 | 7/2011 |
| JP | 2003219467 | 7/2003 |
| JP | 2004342080 | 12/2004 |
| JP | 2005115473 | 4/2005 |
| JP | 2007200209 | 8/2007 |
| JP | 2008511229 | 4/2008 |
| JP | 2009514050 | 4/2009 |
| JP | 2010079831 | 4/2010 |
| WO | 96/41495 | 12/1996 |
| WO | 98/31155 | 7/1998 |
| WO | 00/55783 | 9/2000 |
| WO | 01/11506 | 2/2001 |
| WO | 01/44975 | 6/2001 |
| WO | 01/52462 | 7/2001 |

(56) References Cited

FOREIGN PATENT DOCUMENTS

| WO | 02/50694 | 6/2002 |
|----|----------|--------|
| WO | 03/067376 | 8/2003 |
| WO | 2006/044820 | 4/2006 |
| WO | 2007/123760 | 11/2007 |

OTHER PUBLICATIONS

Dossick, S.E. et al., "WWW access to legacy client/server applications," Fifth International World Wide Web Conference, May 6-10, 1996, Paris, FR, http://iw3c2.cs.ust.hk/WWW5/www5conf.inria.fr/fich_html/papers/P4/Overview.html, (12 pages).

Zenel, B., et al., "A General Purpose Proxy Filtering Mechanism Applied to the Mobile Environment," Wireless Networks, ACM, US, vol. 5, No. 5, Oct. 1999, XP000902494, (9 pages).

Diffie W. et al., "Privacy and Authentication: an introduction to Cryptography," Proceedings of the IEEE, IEEE. New York, US, vol. 67, No. 3, Mar. 1979, pp. 397-426, SP000575227, (32 pages).

Srivastava, J., et al., "Web Usage Mining: Discovery and Applications of Usage Patterns from Web Data," ACM SIGKDD Explorations Newsletter, vol. 1, Issue 2, pp. 12-23, Jan. 2000, (12 pages).

Boyan, J., "The Anonymizer—Protecting User Privacy on the Web," Computer-Mediated Communication Magazine, 'Online! 1997, XP002231197, http://www.december.com/cmc/mag/1997/sep/toc.html, retrieved in 1997, (6 pages).

Choo, C. et al., "A Behavioral Model of Information Seeking on the Web—Preliminary Results of a Study of How Managers and It Specialists Use the Web," Oct. 25, 1998, (16 pages).

Wavecrest Computing, "Cyfin Proxy User Manual for Version 8.2.x," XP55009573, URL:http://downloads.wavecrest.net/release/cyfin/manuals/v820/cyfinProxyManual.pdf, Apr. 9, 2010, (147 pages).

"User Identification and Authentication Vital Security 9.2," XP55009307, http://www.m86security.com/software/secure_web_gateway/manuals.9.2.0/User_Identification_and_Authentication.pdf, Apr. 25, 2010, (27 pages).

"HTTP Proxy Authentication and iPhone Apps," XP55009373, https://discussions.apple.com/message/8018666#8018666, Jan. 15, 2009, (4 pages).

* cited by examiner

300 ⇒

| | DEVICE TYPE | SOURCE IDENTIFICATION (USER-AGENT) | REQUEST DESTINATION | TIMESTAMP |
|---|---|---|---|---|
| 302 → | Windows 7, IE8 | Mozilla/4.0 (compatible; MSIE 8.0; Windows NT 6.1) | movies.netflix.com | 6/17/2011 12:44:00 |
| 304 → | Xbox OS2 | Mozilla/4.0 (compatible; MSIE 9.0b; Xbox-OS2) Obsidian | api.netflix.com | 6/18/2011 15:48:15 |
| 306 → | Sony Google TV | Mozilla/5.0 (X11; U; Linux i686; en-US) AppleWebKit/533.4 (KHTML, like Gecko) Chrome/5.0.375.127 Large Screen Safari/533.4 GoogleTV/ 162671 | www.pandora.com | 6/21/2011 8:05:45 |
| 308 → | Windows 7, IE8 | Mozilla/4.0 (compatible; MSIE 8.0; Windows NT 6.1) | movies.netflix.com | 6/22/2011 9:12:32 |

| | DEVICE TYPE | USAGE/PERIOD |
|---|---|---|
| 318 → | Windows 7, IE8 | 15 |
| 320 → | Xbox OS2 | 10 |
| 322 → | Sony Google TV | 7 |
| 324 → | iPad | 24 |

| | DEVICE TYPE | SOURCE IDENTIFICATION (USER-AGENT) | REQUEST DESTINATION | USAGE/PERIOD |
|---|---|---|---|---|
| 502 → | Windows 7, IE8 | Mozilla/4.0 (compatible; MSIE 8.0; Windows NT 6.1) | movies.netflix.com | 1,019 |
| 504 → | Windows 7, IE8 | Mozilla/4.0 (compatible; MSIE 8.0; Windows NT 6.1) | pandora.com | 254 |
| 506 → | Xbox OS2 | Mozilla/4.0 (compatible; MSIE 9.0b; Xbox-OS2) Obsidian | api.netflix.com | 5,874 |
| 508 → | Xbox OS2 | Mozilla/4.0 (compatible; MSIE 9.0b; Xbox-OS2) Obsidian | zune.com | 174 |
| 510 → | Xbox OS2 | Mozilla/4.0 (compatible; MSIE 9.0b; Xbox-OS2) Obsidian | last.fm | 515 |
| 512 → | Sony Google TV | Mozilla/5.0 (X11; U; Linux i686; en-US) AppleWebKit/533.4 (KHTML, like Gecko) Chrome/5.0.375.127 Large Screen Safari/533.4 GoogleTV/ 162671 | pandora.com | 54 |

FIG. 5

METHODS, APPARATUS, AND ARTICLES OF MANUFACTURE TO IDENTIFY MEDIA PRESENTATION DEVICES

FIELD OF THE DISCLOSURE

This disclosure relates generally to media presentation measurement, and, more particularly, to methods, apparatus, and articles of manufacture to identify media presentation devices.

BACKGROUND

In recent years, more consumer devices have been provided with Internet connectivity and the ability to retrieve media content from the Internet. As such, media exposure has somewhat shifted away from conventional sources such as broadcast television toward more on-demand types of sources.

BRIEF DESCRIPTION OF THE DRAWINGS

FIG. 3A is a table of example media requests stored in the example source identification database of FIG. 2.

FIG. 3B is a table of example media presentation device statistics generated by the example usage tracker of FIG. 2.

FIG. 5 is a table of example usage information stored in the example usage information database of FIG. 4.

DETAILED DESCRIPTION

Figure 1:
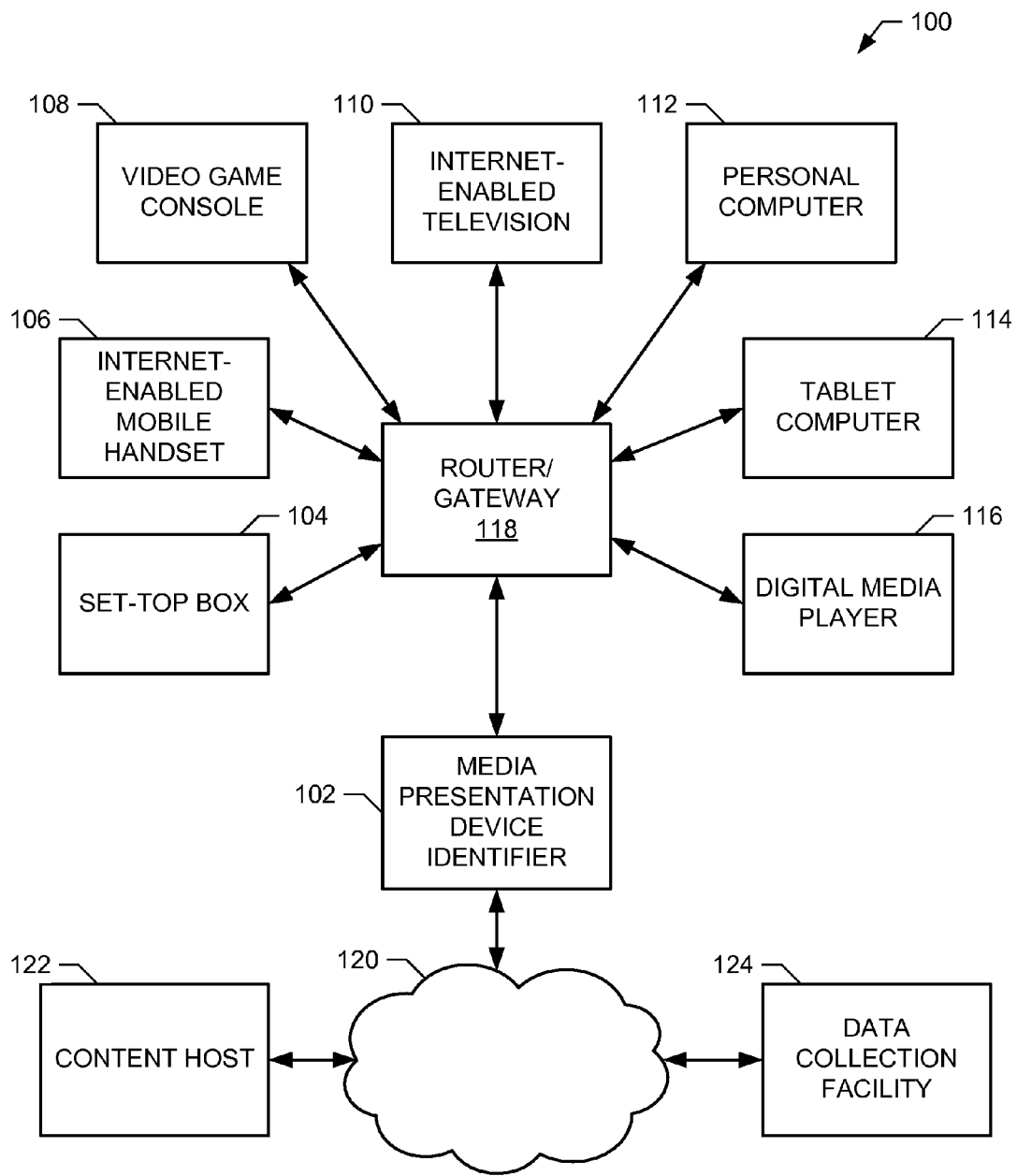
FIG. 1 is a block diagram of an example system including a media presentation device identifier to identify media presentation devices.

As used herein, the term "media" can include any type of content, such as television, radio, advertisements, movies, web sites, etc. Example methods, apparatus, and articles of manufacture disclosed herein identify media presentation devices and/or types of media presentation devices for media measurement. For example, identifications of media presentation devices used in consumer locations (e.g., homes, offices, etc.) can be aggregated to determine ownership and/or usage statistics of available media presentation devices, relative rankings of usage and/or ownership of media presentation devices, types of uses of media presentation devices, and/or other types of media presentation device information.

In some disclosed examples, a media presentation device identifier includes a local network interface to receive a network-bound data packet originating from a media presentation device that is coupled to a local network. In such examples, the network-bound data packet includes at least a source identification, and a source identifier to identify a device type of the media presentation device based on the source identification. In some examples, the network-bound data packet is a HyperText Transfer Protocol (HTTP) request or a Session Initiation Protocol (SIP) message. In some such examples, the source identification is a User-Agent string.

In some examples, the media presentation device identifier includes a wide-area network interface to forward the network-bound data packet to a wide-area network. In some examples, the wide-area network interface also receives an inbound data packet that includes media content requested by the media presentation device. In some examples, the local network interface forwards the inbound data packet to the media presentation device.

In some examples, a media presentation device identifier identifies a media presentation device by monitoring for an outbound data packet originating in a local network and including a source identification, identifying a source type of a media presentation device based on the source identification, and storing the source type and an indication of media exposure. Some example methods further include monitoring for an inbound data packet destined for the media presentation device, identifying media content based on auxiliary data included in the inbound data packet, and storing the media content identification in association with the source type. In some examples, the method further includes storing a media request based on the network-bound data packet, determining whether the inbound data packet corresponds to the media request, and storing information representative of the inbound data packet when the inbound data packet corresponds to the media request. In some examples, media presentation devices include at least-top boxes, Internet-enabled handsets, video game consoles, Internet-enabled televisions, personal computers, tablet computers, and/or digital media players.

Example methods, apparatus, and articles of manufacture disclosed herein are located in a local area network (LAN) at a media exposure measurement location having multiple media presentation devices. These example methods, apparatus, and articles of manufacture are interposed between the media presentation devices and a wide area network (WAN), such as the Internet, that includes one or more content servers that provide media content in response to request(s) from the media presentation devices. Example methods, apparatus, and articles of manufacture disclosed herein intercept outgoing messages (e.g., media requests from media presentation devices on the same LAN as the intercepting method, apparatus, or article of manufacture) to the WAN and generate media exposure statistics based on the outgoing messages. Some such example methods, apparatus, and articles of manufacture additionally or alternatively generate the media exposure statistics based on messages from the WAN to the media presentation devices on the LAN. Some example methods, apparatus, and articles of manufacture disclosed herein determine the type(s) of media presentation device based on the outgoing messages but, unlike media content providers that track usage statistics, do not return any content to the media presentation device(s) originating the outgoing messages.

A known system to monitor display of content is disclosed in Blumenau, U.S. Pat. No. 6,108,637, issued Aug. 22, 2000. Generally, Blumenau disclosed using a content provider site to provide measurement instructions to a content display site, which executes the instructions to result in measurement information.

Example methods, apparatus, and articles of manufacture disclosed herein can collect media presentation device information corresponding to multiple media presentation devices and/or multiple content servers without cooperation from any content provider sites.

FIG. 1 is a block diagram of an example system 100 including a media presentation device identifier 102 to identify media presentation devices. The example system 100 may be used to identify media presentation devices on the same local area network (LAN) as the media presentation device identifier 102. Example media presentation devices, such as those illustrated in FIG. 1, include a set-top box 104, an Internet-enabled mobile handset 106 (e.g., a smartphone), a video game console 108 (e.g., Xbox®, Playstation® 3), an Internet-enabled television 110, a personal computer 112, a tablet computer 114 (e.g., an iPad®), and/or a digital media player 116 (e.g., a Roku® media player, a Slingbox®, etc.). The media presentation devices 104-116 of the illustrated example are coupled to a router/gateway 118 that communicatively couples the devices 104-116 to each other and to a wide area network (WAN) 120 such as the Internet. The example media presentation devices 104-116 and the router/gateway 118 may be located at the same geographic location such as a measured household, at which the example media presentation device identifier 102 is to collect media exposure information about the measured location.

In some examples, the media presentation device identifier 102, the media presentation devices 104-116, and the router/gateway 118 are located in a household associated with one or more panelists. In some such examples, panelists are selected to participate in an audience measurement study (e.g., conducted by an audience measurement entity such as The Nielsen Company) to be generally reflective of one or more population(s) whose media usage habits are of interest. Panelists may be selected and/or recruited in any desired manner. The panelists are typically required to provide demographic information data (e.g., gender, race, religion, income, education level, etc.) to facilitate correlating detected behaviors to demographic populations.

The example router/gateway 118 of FIG. 1 includes a consumer router and, in some examples, includes gateway functionality such as modem capabilities. In some other examples, the router/gateway 118 is implemented in two or more devices. In some examples such as the system 100 of FIG. 1, the media presentation device identifier 102 is implemented between the router/gateway 118 and the example network 120. In some other examples, the media presentation device identifier 102 is implemented within the example router/gateway using software and/or firmware executed on hardware. For instance, some routers and/or gateways permit custom firmware and/or software to be loaded and/or executed. Such routers and/or gateways may be provided with firmware and/or software that, in addition to standard routing and/or modem behavior, monitor messages or data packets directed from the devices 104-116 to the network 120 and/or directed from the network 120 to the devices 104-116. In some examples, the media presentation device identifier 102 is connected to a port of the router/gateway 118 on the LAN, and the router/gateway 118 mirrors some or all messages (e.g., packets) to the media presentation device identifier 102.

In the illustrated example of FIG. 1, one or more of the media presentation devices 104-116 request media content to be delivered from a content host (e.g., content host 122). The content host 122 of the illustrated example may be any provider of digital media content such as a digital broadcast provider (cable television service, fiber-optic television service, etc.) and/or an on-demand digital content provider (e.g., Internet streaming video and/or audio services such as Netflix®, YouTube®, Hulu®, Pandora®, Last.fm®, and/or any other provider of digital streaming media services). In some other examples, the content host 122 is a host server for a web site. For example, if a user desires to watch an on-demand video available from the content host 122 on the personal computer 112, the personal computer 112 generates a request (e.g., a Hypertext Transfer Protocol (HTTP) GET request, a Session Initiation Protocol (SIP) INVITE request, etc.) and sends the request to the content host 122 via the router/gateway 118 and the network 120.

While general classes of example media presentation devices are illustrated in FIG. 1, each of the example media presentation devices 104-116 may have a large number of different types of devices falling within that class. Media presentation devices that have very similar or even identical hardware may have substantially different software and/or firmware, which can also cause the media presentation devices to be considered different types.

Depending on which of the example devices 104-116 makes the request, and depending on the characteristics of the requesting device, the request for the media content may be different even if the requested media content is the same. In particular, each of the example devices 104-116 includes a different source identification in the request. For example, the HTTP GET request specification permits a source identification referred to as the User-Agent field. The User-Agent field enables the device 104-116 generating the request to populate the User-Agent field with information identifying the type of the device. An example HTTP request including source identification information that a Microsoft® Xbox 360® (e.g., the video game console 108) may use to request a file (e.g., media.html) from a website (e.g., mediasourcewebsite.com) is:

GET /mediapath/media.html HTTP/1.0
From: mediapath@mediasourcewebsite.com
User-Agent: Mozilla/4.0 (compatible; MSIE 9.0b; Xbox-OS2) Obsidian Another example HTTP request including source identification information that a Sony® Google® Internet Television (e.g., the Internet-enabled television 110) may use to request the same file (media.html) from the same website (mediasourcewebsite.com) is:

GET /mediapath/media.html HTTP/1.0
From: mediapath@mediasourcewebsite.com
User-Agent: Mozilla/5.0 (X11; U; Linux i686; en-US) AppleWebKit/533.4 (KHTML, like Gecko) Chrome/5.0.375.127 Large Screen Safari/533.4 GoogleTV/162671

As illustrated by the different User-Agent fields, the example media presentation device identifier 102 of FIG. 1 may use the different source identification information to identify the type and/or characteristics of the device 104-116 from which the request originates.

To this end, the example media presentation device identifier 102 snoops the example request to identify the type of the requesting device (e.g., that the requesting device is a personal computer, the type of requesting program, etc.). For example, the media presentation device identifier 102 may be coupled between the router/gateway 118 and the network 120 to snoop requests and/or responses outbound from the devices 104-116 on the LAN to the WAN 120 (e.g., to the content host 122), and/or inbound from the WAN 120 to the device(s) 104-116. The example media presentation device identifier 102 of the illustrated example is transparent to the router/gateway 118. When the example media presentation device identifier 102 identifies an HTTP GET request from one of the media presentation devices 104-116, the device identifier 102 identifies the type of the media presentation device 104-116 based on the contents of the source identification (e.g., the User-Agent field).

In some examples, the media presentation device identifier 102 stores the identified type of the device in association with information representative of the request, such as a timestamp, and an identifier of the requested media content. In this manner, the example media presentation device identifier 102 collects media exposure information to help identify, for example, which media presentation devices are the most-frequently owned, the most-frequently used, the least-frequently owned, the least-frequently used, the most/least-frequently used for particular type(s) of media usage, etc.

Upon receiving the request, the content host 122 processes the request. In some examples, the content host 122 determines the contents of the User-Agent field and identifies the type of the requesting device from the contents. Some content hosts 122 will format the response based on the User-Agent field (e.g., formatting or compressing video and/or audio content to better fit the device corresponding to the contents of the User-Agent field). For example, a specific type of Internet-enabled mobile handset 106 may be known to support lower video resolutions than most video game consoles 108. As a result, the content host 122 may format a requested video to a lower resolution for delivery to the particular Internet-enabled mobile handset 106 than to the particular video game console 108.

If appropriate, the content host 122 begins to transfer the requested content to the requesting device (e.g., the personal computer 112) via the network 120 and the router/gateway 118. In some examples, the content transferred from the content host 122 is also delivered using a protocol similar or identical to the protocol used by the personal computer 112 to make the request. The example media presentation device identifier 102 monitors the inbound data packets to determine one or more packets that correspond to a media request (e.g., media content for delivery to one of the media presentation devices 104-116). The media presentation device identifier 102 handles the inbound packets to, for example, determine an origin and/or a destination of the inbound packet. Such information can be used to determine which of the media presentation devices 104-116 are presenting media content and/or for how long such media presentation occurs.

In the illustrated example of FIG. 1, the media presentation device identifier 102 provides media presentation device information to a data collection system 124 via the network 120. The data may be paired with other factors, such as the geodemographic characteristics of the measured location in which the media presentation device identifier 102 is located. The example data collection system 124 receives the media presentation device information from the media presentation device identifier 102 in addition to media presentation device information from other media presentation device identifiers at other measurement sites (e.g., additional households, etc.).

The data collection system 124 of the illustrated example collects and processes the media presentation device information to generate aggregate media presentation device information to identify, for example, which media presentation devices are the most owned, the most-frequently used, the least-frequently owned, the least-frequently used, the most/least-frequently used for particular type(s) and/or genre (s) of media, and/or other media statistics or aggregate information that may be determined from the data. The media presentation device information may also be correlated or processed with factors such as geodemographic data. Aggregate media presentation device information may be useful to manufacturers and advertisers to determine which features should be improved, determine which features are popular among users, identify geodemographic trends with respect to media presentation devices, identify market opportunities, and/or otherwise evaluate their own and/or their competitors' products.

Figure 2:
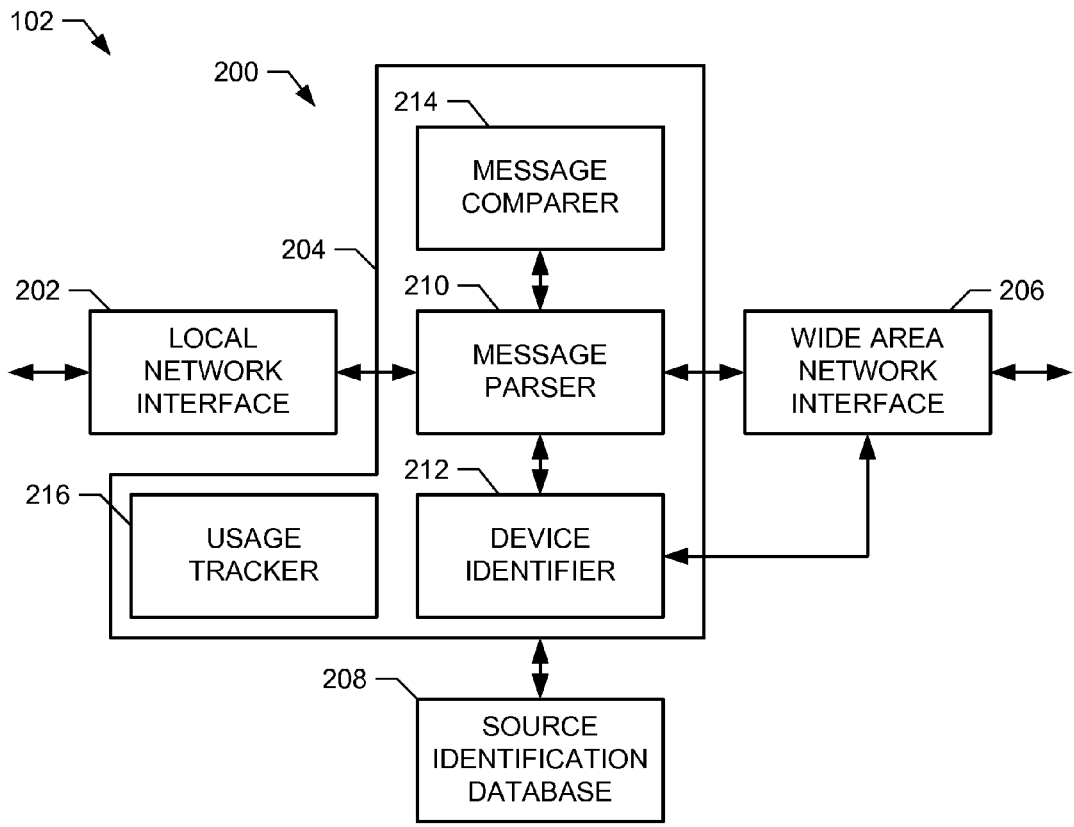
FIG. 2 is a block diagram of an example implementation of the media presentation device identifier of FIG. 1.

FIG. 2 is a block diagram of an example media presentation device identifier 200 to implement the example media presentation device identifier 102 of FIG. 1. The example media presentation device identifier 200 of FIG. 2 includes a local network interface 202, a source identifier 204, a wide area network interface 206, and a source identification database 208.

The example local network interface 202 receives a network-bound (e.g., outbound) data packet originating from a media presentation device (e.g., one or more of the media presentation devices 104-116 of FIG. 1). In some examples, both the local network interface 202 and the media presentation device 104-116 are coupled to a local network. The example network-bound data packet includes a source identification, such as a User-Agent field. The example local network interface 202 of FIG. 2 provides the network-bound data packet, or at least the source identification, to the example source identifier 204.

The example source identifier 204 identifies, based on the source identification, a source type (e.g., a type of media presentation device 104-116 such as a video game console 108, a sub-type of media presentation device 104-116 such as an Xbox, etc.) of the media presentation device 104-116 from which the network-bound data packet originated. To this end, in some examples the source identifier 204 queries the source identification database 208 to determine a source type corresponding to the content of the source identification. In some examples, the media presentation device identifier 200 maintains its own source identification database that is periodically and/or aperiodically updated to add, remove, and/or modify source identification entries. Additionally or alternatively, the example source identifier 204 may query an external source identification database (e.g., via the network 120 of FIG. 1) to determine a source type corresponding to the content of a source identification.

As illustrated in FIG. 2, the example source identifier 204 includes a message parser 210, a device identifier 212, a message comparer 214, and a usage tracker 216. The example message parser 210 identifies content of the source identification and provides the content to the device identifier 212. The example device identifier 212 identifies a type of a media presentation device based on the content. In some examples, the device identifier 212 queries the source identification database 208 to determine the device type. In some examples, the device identifier 212 communicates with an external database (e.g., a User-Agent database such as user-agents.org). For example, some User-Agent databases provide eXtensible Markup Language (XML)-formatted versions, text-formatted versions, comma-separated value (CSV)-formatted versions, and/or other standardized computer-readable formats, which the device identifier 212 may parse and search based on the content of the User-Agent field of the network-bound data packet to identify the type of the media presentation device associated with a message.

The example device identifier 212 of FIG. 2 stores media requests, including the identified device types in the source identification database 208 in association with information such as a timestamp, an identifier of requested media content, an identifier of a requested content host, an identification of the media presentation device identifier 200 and/or the measurement location. The example source identification database 208 of FIG. 2 stores the reference source identifications. At periodic and/or aperiodic intervals and/or in response to a request, the example device identifier 212 retrieves the identified media requests from the source identification database 208 with any corresponding information stored therewith (e.g., the identified device types), and transfers the identified media requests and the corresponding information to an external data collector (e.g., the data collection system 124). The example device identifier 212 of FIG. 2 transfers the media requests to the data collection system 124 via the WAN interface 206 and the example network 120.

The example WAN interface 206 receives network-bound data packets from the source identifier 204 and forwards the packets to a network (e.g., the network 120). Additionally, the WAN interface 206 receives inbound data packets from the network 120 destined for the media presentation devices 104-116. At least some of the inbound data packets in the illustrated example include digital media content corresponding to request(s) from the example media presentation devices 104-116. For example, the message parser 210 may determine that an inbound data packet is received from the content host 122 (e.g., by inspecting aspects of the inbound data packet) and that the data packet includes a payload of media content (e.g., the packet includes an HTTP response having an encapsulated Real Time Messaging Protocol Tunneled (RTMPT) payload). In some examples, the message parser 210 identifies media content in the inbound data packets based on auxiliary data (e.g., metadata) in the content of the inbound data packets. In some such examples, the identification and/or the auxiliary data are stored in the example source identification database 208 in association with a corresponding media request.

The example message parser 210 provides the inbound message to the message comparer 214. The example message comparer 214 compares the inbound data packet to, for example, stored network-bound data packets to associate the inbound data packet with one of the media presentation devices 104-116 that sent a request for the media content. In some examples in which the media presentation device identifier 200 is implemented in a router/gateway (e.g., the router/gateway 118 of FIG. 1), the message comparer 214 further determines to which of the devices 104-116 the inbound data packet is to be forwarded. The example message comparer 214 stores information representative of the inbound data packet in association with the type of the destination media presentation device 104-116, a timestamp of receipt of the inbound data packet, and/or an identification of the media content (if available). This information may be provided to the example data collection system 124 and processed to determine, for example, how long content is delivered to different types of media presentation devices 104-116 during contiguous media exposure sessions using each of the different types of devices 104-116.

The example usage tracker 216 of FIG. 2 tracks the usage of the media presentation devices 104-116. In some examples, the usage tracker 216 generates media presentation information and/or usage statistics based on information stored in the source identification database 208 and/or provided by the device identifier 212. In some such examples, the usage tracker 216 generates usage statistics based on media requests (and/or data entries representative of media requests) to generate information such as usage per time period of interest for each device type of the example devices 104-116. Such information can be used to monitor patterns of media exposure over time and/or for particular events, and/or can be correlated with media exposure information collected using other methods and/or devices (e.g., broadcast television audience measurement) to provide enhanced audience measurement data and/or to verify the accuracy of the audience measurement data collected via the other methods and/or devices.

FIG. 3A is a table 300 of example media request entries 302, 304, 306, 308 stored in the example source identification database 208 of FIG. 2. As described above, the example device identifier 212 of FIG. 2 stores media requests in the source identification database 208. Each of the example media request entries 302-308 of FIG. 3A includes a device type 310, a source identification 312 (e.g., a User-Agent string), a request destination 314, and a timestamp 316. However, the media request entries 302-306 may additionally or alternatively include other information, such as requested media, geodemographic information, and/or other information indicative of media exposure in a measured location. The media requests may be, for example, an HTTP request, an HTTP GET message, or any other type of request using any past, present, or future protocol.

The example device type 310 of FIG. 3A is a description of a device corresponding to the source identification 312 of that device. In some examples, the example device identifier 212 combines different, but similar, source identifications 312 into a common device type 310, such as when a device has multiple software and/or hardware variations from which a consumer or user may choose. The example request destination 314 includes the destination to which the media presentation device 104-116 directs the HTTP GET message from which the device identifier 212 determines the source identification. In some examples, the source identification 312 is omitted from the table 300 as redundant to or unneeded in view of to the identification and inclusion of the device type 310. The example timestamp 314 includes the time and/or date at which the media request was generated by the identified media presentation device 104-116.

FIG. 3B is a table 316 of example media presentation device statistics generated by the example usage tracker 216 of FIG. 2. In some examples, the usage tracker 216 generates the table 316 (or another data structure of a similar or different format) and stores the table 316 in the source identification database 208 and/or another storage structure. The example table 316 includes media presentation information 318, 320, 322, 324 determined from the media request entries 302-308 of the table 300 of FIG. 3A. The media presentation information 318, 320, 322, 324 of FIG. 3B is organized according to device type 310 and shows the usage per period 326 (e.g., a time period of interest) for the example media presentation devices 104-116. To determine the usage per period 326, the example usage tracker 216 analyzes the media request entries 302-308 of FIG. 3A to determine which of the media request entries 302-308 has a timestamp 314 falling within the time period of interest. For those media request entries 302-308 that are within the time period of interest, the example usage tracker 216 determines how many media request entries 302-308 exist for each of the different device types 310. The example usage tracker 216 populates the table 316 with the usage per period 326 for each of the device types 310, and stores the table 316 in the example source identification database 208. The example media presentation information 318 may later be provided to, for example, the data collection system 124 of FIG. 1 for aggregation with media presentation information from other collection or measurement sites.

Figure 4:
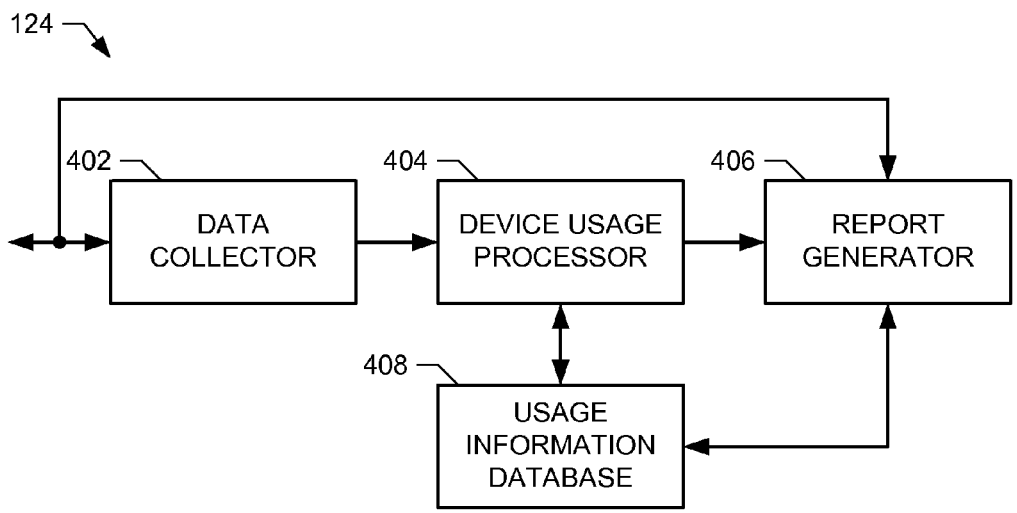
FIG. 4 is a block diagram of an example data collection system to implement the data collection facility of FIG. 1.

FIG. 4 is a block diagram of an example implementation of the data collection system 124 of FIG. 1. The example data collection system 124 of FIG. 4 is coupled to a network, such as the example network 120 of FIG. 1, to communicate with media presentation device identifiers (e.g., the media presentation device identifier 102 of FIG. 1) for collection of device usage information. As illustrated in FIG. 4, the example data collection system 124 includes a data collector 402, a device usage processor 404, a report generator 406, and a usage information database 408.

The example data collector 402 of FIG. 4 receives media request information (e.g., a number of media requests, an identifier of the media presentation device identifier 102 providing the media requests, etc.) from multiple media presentation device identifiers via the network. In some examples, the media request information identifies multiple types of media presentation devices, which correspond to the presence of multiple ones of the media presentation devices 104-116 on different local networks of measured locations. The data collector 402 provides the received media request information, including the device types, to the device usage processor 404.

The example device usage processor 404 of FIG. 4 processes the device types to determine usage information for the device types. In some examples, the device usage processor 404 processes the media request information to determine additional or alternative usage information, such as ranks of device types by usage, ranks of device types by ownership, usage and/or rank of device types for specified type(s) of media exposure, and/or other information that may be determined from the media request information. For example, the device usage processor 404 aggregates the device types to determine an amount of usage in a period of time of interest for each of the device types. In another example, the device usage processor 404 aggregates the device types and the request destination to determine what types of media usage are performed on different types of devices. After processing the usage information, the example device usage processor 404 stores the usage information in the usage information database 408.

The example report generator 406 of FIG. 4 generates report(s) of the usage information processed by the example device usage processor 404. In some examples, the report generator 406 generates reports specified by a user of the example data collection system 124. The example report generator 406 receives requests and/or parameters for report types via the network 120. In some examples, the report generator 406 receives requests and/or parameters from a local input device (e.g., a keyboard, a mouse, a touch interface, etc.).

To generate the report(s), the example report generator 406 retrieves usage information from the usage information database 408 and/or receives the usage information from the device usage processor 404. In some examples, the report generator 406 stores the report(s) in the usage information database 408 for later processing. The example usage information database 408 stores the usage information determined by the device usage processor 404 and/or reports generated by the report generator 406.

FIG. 5 is a table 500 of example usage information 502, 504, 506, 508, 510, 512 stored in the example usage information database 408 of FIG. 4. The example usage information 502-512 of FIG. 5 includes a device type 514, source identification (e.g., a User-Agent string) 516, a request destination 518, and usage per period 520. The example table 500 is assembled and/or updated by the device usage processor 404. The example report generator 406 generates reports that may include information similar to the usage information 502-512 based on a request from a user.

The example device type 514 is similar to the device type 308 of the table 300 of FIG. 3A. Additionally, the example source identification 516 is similar to the source information 308, and the request destination 518 is similar to the request destination 310 of FIG. 3A. The example device usage processor 404 of FIG. 4 may generate the usage information 502-512 by aggregating the media request information received by the data collector 402 by the device type 308 and by the request destination 312. For example, the usage information 502, 504 have identical device types 514 but have different request destinations 518. Accordingly, the example usage information 502, 504 are listed in separate entries. However, the example table 500 may be arranged and/or sorted by different ones of the fields 514-520, and/or may include additional fields, based on the information received in the media requests by the media presentation device identifiers.

The example usage per period 520 of FIG. 5 is a sum of the number of media requests received per reporting period (e.g., per day, per week, per bi-week, per month, etc.) from the media presentation device identifiers. To determine the usage per period 520, the example device usage processor 404 of FIG. 4 counts the number of media requests having a particular device type 514 and a particular request destination 518 and having a timestamp (e.g., time and/or date information) falling within a time period of interest.

While example manners of implementing the media presentation device identifier 102 and the data processing system 124 of FIG. 1 have been illustrated in FIGS. 2 and 4, one or more of the elements, processes and/or devices illustrated in FIGS. 2 and 4 may be combined, divided, re-arranged, omitted, eliminated and/or implemented in any other way. Further, the example local network interface 202, the example source identifier 204, the example WAN interface 206, the example source identification database 208, the example message parser 210, the example device identifier 212, the example message comparer 214, the example usage tracker 216, the example data collector 402, the example device usage processor 404, the example report generator 406, the example usage information database 408 and/or, more generally, the example media presentation device identifier 200 of FIG. 2 and/or the example data collection system 124 of FIG. 4 may be implemented by hardware, software, firmware and/or any combination of hardware, software and/or firmware. Thus, for example, any of the example local network interface 202, the example source identifier 204, the example WAN interface 206, the example source identification database 208, the example message parser 210, the example device identifier 212, the example message comparer 214, the example usage tracker 216, the example data collector 402, the example device usage processor 404, the example report generator 406, the example usage information database 408 and/or, more generally, the example media presentation device identifier 200 of FIG. 2 and/or the example data collection system 124 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example local network interface 202, the example source identifier 204, the example WAN interface 206, the example source identification database 208, the example message parser 210, the example device identifier 212, the example message comparer 214, the example usage tracker 216, the example data collector 402, the example device usage processor 404, the example report generator 406, and/or the example usage information database 408 are hereby expressly defined to include a tangible computer readable medium such as a memory, DVD, CD, etc. storing the software and/or firmware. Further still, the example media presentation device identifier 200 of FIG. 2 and/or the data collection system 124 of FIG. 4 may include one or more elements, processes and/or devices in addition to, or instead of, those illustrated in FIGS. 2 and 4, and/or may include more than one of any or all of the illustrated elements, processes and devices.

Figure 6:
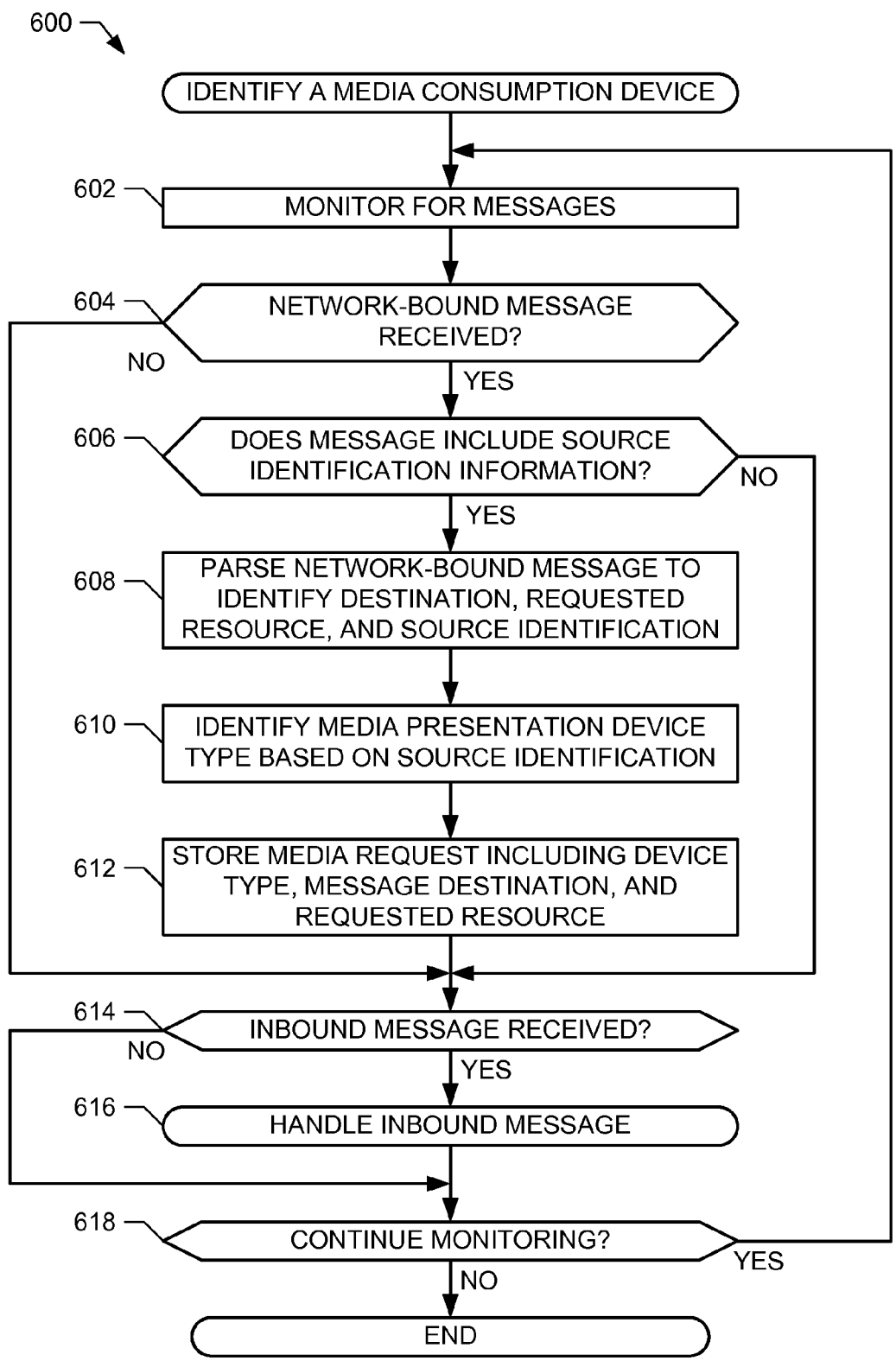
FIG. 6 is a flowchart representative of example machine readable instructions which may be executed to implement the example media presentation device identifier of FIG. 2 to identify a media presentation device.
Figure 7:
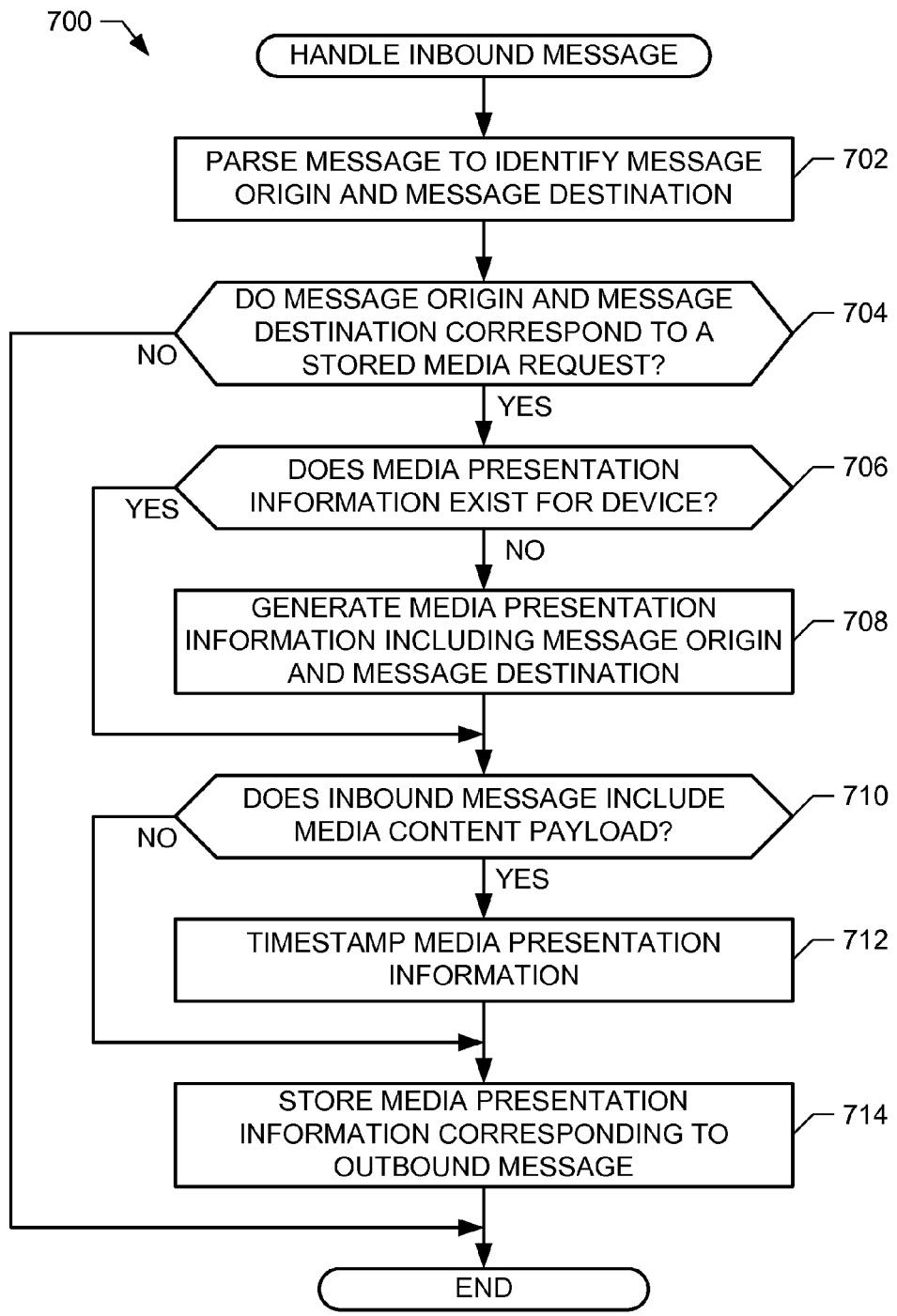
FIG. 7 is a flowchart representative of example machine readable instructions which may be executed to implement the example media presentation device identifier of FIG. 2 to handle an inbound message.
Figure 8:
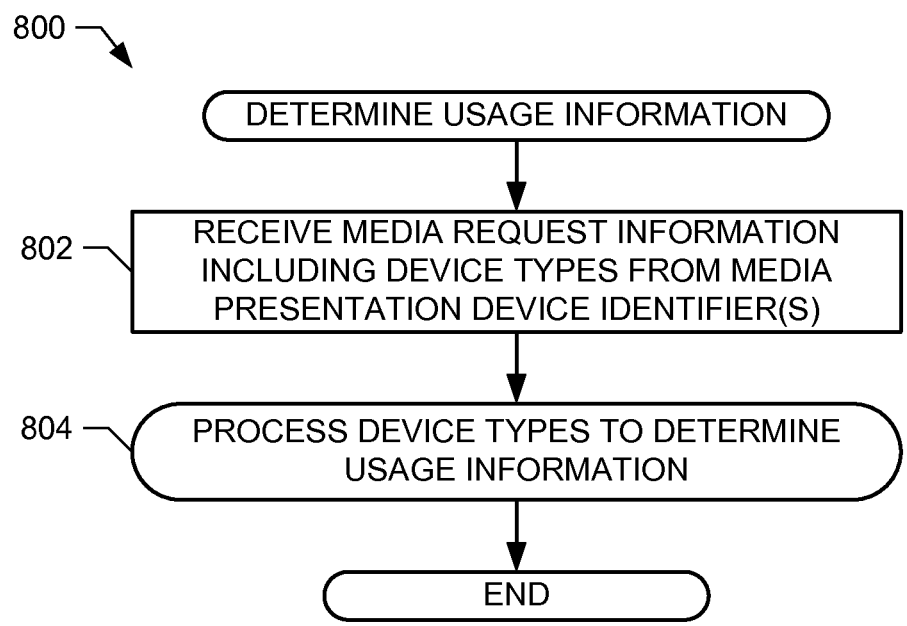
FIG. 8 is a flowchart representative of example machine readable instructions which may be executed to implement the data collection system of FIG. 4 to determine usage information.
Figure 9:
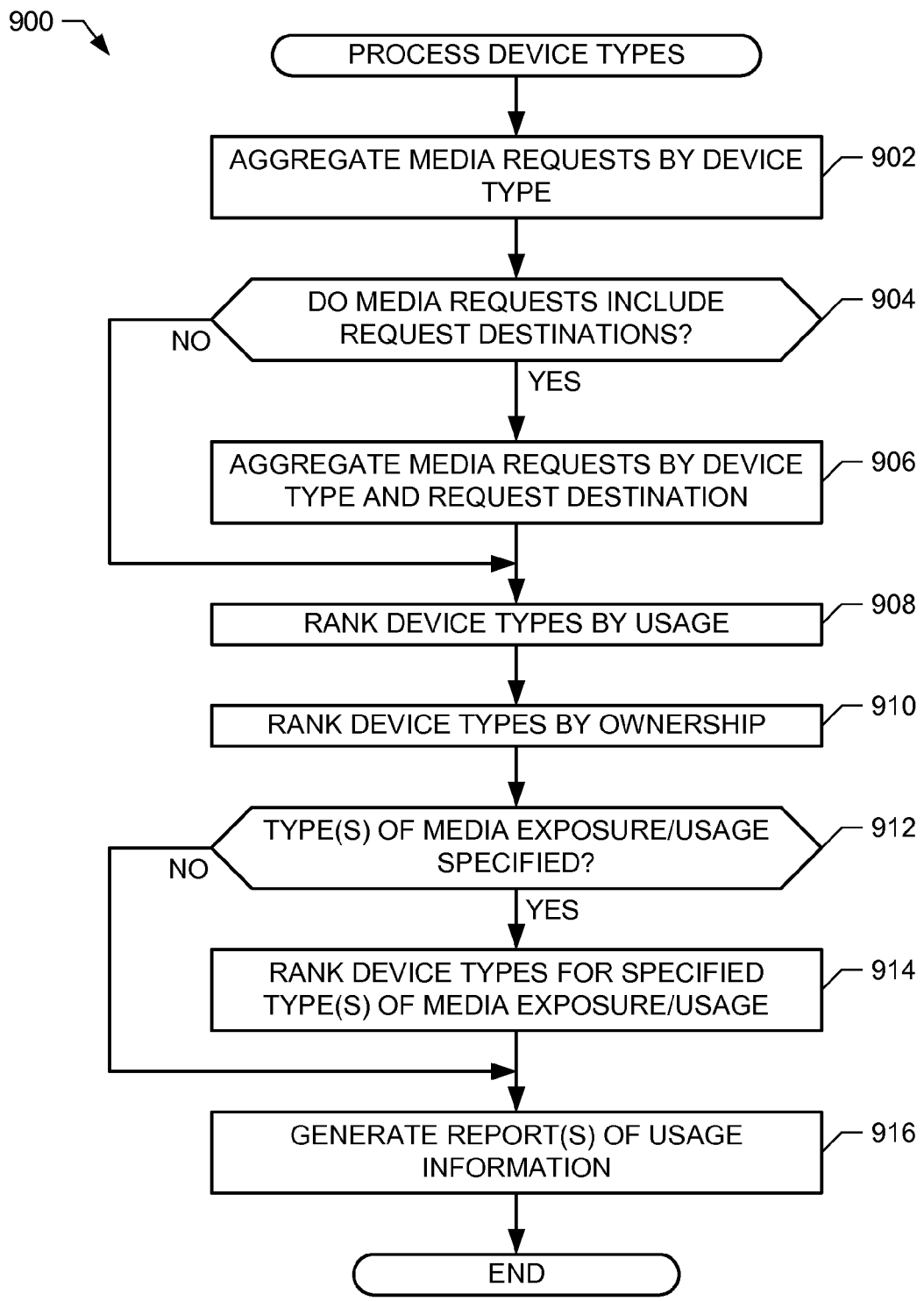
FIG. 9 is a flowchart representative of example machine readable instructions which may be executed to implement the example data collection system of FIG. 4 to process device types.

Flowcharts representative of example machine readable instructions for implementing the media presentation device identifier 200 of FIG. 2 are shown in FIGS. 6 and 7. Flowcharts representative of example machine readable instructions for implementing the data collection system 124 of FIG. 4 are shown in FIGS. 8 and 9. In these examples, the machine readable instructions comprise program(s) for execution by a processor such as the processor 1012 shown in the example processor platform 1000 discussed below in connection with FIG. 10. The program may be embodied in software stored on a tangible computer readable medium such as a CD-ROM, a floppy disk, a hard drive, a digital versatile disk (DVD), or a memory associated with the processor 1012, but the entire program and/or parts thereof could alternatively be executed by a device other than the processor 1012 and/or embodied in firmware or dedicated hardware. Further, although the example program(s) are described with reference to the flowcharts illustrated in FIGS. 6-9, many other methods of implementing the example media presentation device identifier 200 and/or the data collection system 124 may alternatively be used. For example, the order of execution of the blocks may be changed, and/or some of the blocks described may be changed, eliminated, or combined.

As mentioned above, the example processes of FIGS. 6-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 6 is a flowchart representative of example machine readable instructions 600 which may be executed to identify a media presentation device. The example instructions 600 may be implemented by the example media presentation device identifier 200 of FIG. 2.

The example instructions 600 of FIG. 6 begin with the example media presentation device identifier 200 (e.g., via the local network interface 202 and/or the WAN interface 206 of FIG. 2) monitoring for messages (e.g., data packets) (block 602). For example, the local network interface 202 monitors local port(s) coupled to the media presentation devices 104-116 of FIG. 1 to determine whether any network-bound data packets have been received via the local port(s). Similarly, the example WAN interface 206 monitors WAN port(s) to determine whether any inbound data packets have been received via the WAN port(s).

The example source identifier 204 determines whether a network-bound message has been received (block 604). For example, the source identifier 204 may identify whether any messages have been forwarded to the source identifier 204 from the local network port 202. If a network-bound message has been received (block 604), the example source identifier 204 determines (e.g., via the message parser 210) whether the network-bound message includes source identification information (block 606). For example, the message parser 210 may determine whether the network-bound message includes source identification such as a User-Agent field.

If the example network-bound message includes source identification information (block 606), the example message parser 210 parses the network-bound message to identify a destination of the message, a requested resource, and the source identification (block 608). For example, the message parser 210 may determine an address of the content host 122 as the destination, a video file as the requested resource, and a User-Agent string as the source identification.

The example device identifier 212 uses the example source identification determined by the message parser 210 to identify a type of the media presentation device (block 610). For example, the device identifier 212 may query an internal User-Agent database and/or an external User-Agent database using the content of the source identification. If the example User-Agent corresponds to a device type in the queried database, the example device identifier 212 will receive a device type, such as a description of the device. In this manner, the example device identifier 212 identifies the media presentation device type using the source identification.

The example device identifier 212 further stores a media request entry including the identified media presentation device type, the destination of the network-bound message, and the requested resource (block 612). In some examples, however, the device type is stored, or the device type is stored with one of the destination of the network-bound message or the requested resource. In some other examples, the device type is stored in association with other information representative of the network-bound message determined by the example message parser 210 and/or the example device identifier 212.

After storing the media request entry (block 612), if a network-bound message has not been received (block 604), or if a received network-bound message does not include source identification information (block 606), the example source identifier 204 determines whether an inbound message has been received (block 614). If an inbound message has been received (block 614), the example source identifier 204 handles the inbound message (block 616). A flowchart representative of example machine readable instructions to handle an inbound message, which may be used to implement block 616, is shown in FIG. 7 and described in more detail below.

After handling the inbound message (block 616), or if no inbound message has been received (block 614), the example source identifier 204 determines whether to continue monitoring for messages (block 618). If the source identifier 204 is to continue monitoring for messages (block 618), control returns to block 602 to monitor for messages. On the other hand, if the source identifier 204 is to discontinue monitoring for messages (block 618), the example instructions 600 end. In some examples, the instructions 600 are iterated or invoked again at a later time.

FIG. 7 is a flowchart representative of example machine readable instructions 700 which may be executed to implement the example media presentation device identifier 200 of FIG. 2 to handle an inbound message. The example instructions 700 may be used to implement block 616 of FIG. 6 to handle an inbound message (e.g., when an inbound message has been received). In some examples, the media presentation device identifier 200 executes the instructions 700 when a message is received via the WAN interface 206 destined for a device on a local network (e.g., one of the media presentation devices 104-116 of FIG. 1).

The example message parser 210 parses the inbound message to identify a message origin and a message destination (block 702). For example, the message parser 210 may determine that the inbound message includes information representative of the origin of the inbound message and/or to which device 104-116 the inbound message is destined. To determine the origin and the destination of the inbound message, the example message parser 210 evaluates the header of the Internet Protocol message encapsulating the HTTP or other message.

The example message comparer 214 determines whether the message origin and the message destination correspond to a stored media request (block 704). For example, the message comparer 214 accesses the media requests entries in the source identification database 208 and compares the message origin to the request destination 312 and/or compares the message destination to an IP address field (not shown in FIG. 3A) to determine the device type (and/or the individual device) to which the inbound message is to be delivered. If the message origin and the message destination correspond to a stored media request (block 704), the example message comparer 214 determines whether media presentation information exists for the device (block 706). For example, the message comparer 214 queries the source identification database 208, using the device type corresponding to the media request determined in block 704, to determine whether media presentation information exists for the device. If media presentation information does not exist for the device (block 706), the example message comparer 214 generates media presentation information including the message origin and the message destination (block 708).

If media presentation information does exist for the device (block 706), or after generating the media presentation information (block 708), the example message parser 210 determines whether the inbound message includes a media content payload (block 710). For example, the message parser 210 evaluates the header and/or the payload of the message (e.g., the size of the payload) to determine whether the inbound message includes audio, video, and/or other media content. If the inbound message includes a media content payload (block 710), the example message parser 210 timestamps the media presentation information for the device (block 712). The timestamp, in combination with additional timestamps corresponding to additional inbound messages received at the WAN interface 206, may be used to determine length(s) of substantially-contiguous media presentation session(s) using the media presentation device.

After timestamping the media presentation information (block 712), or if the inbound message does not include a media content payload (block 710), the example message comparer 214 or the message parser 210 stores the media presentation information corresponding to the outbound message (block 714). For example, the example message comparer 214 or the message parser 210 stores the message origin, the message destination, the timestamp(s), and/or any other information included in the media presentation information, in the source identification database 208 in association with a corresponding media request entry. After storing the media presentation information (block 714), or if the message origin and/or the message destination do not correspond to a stored media request (block 704), the example instructions 700 end and control returns to block 618 of the example instructions 600 of FIG. 6.

FIG. 8 is a flowchart representative of example machine readable instructions 800 which may be executed to implement the data collection system 124 of FIG. 4. The example data collection system 124 may implement the instructions 800 to process media request information to determine usage information for media presentation devices.

The example instructions 800 of FIG. 8 begin by receiving (e.g., via the data collector 802) media request information, including devices types, from media presentation device identifier(s) (block 802). In some examples, the data collector 802 receives the media request information from a number of media presentation device identifiers, such as the media presentation device identifier 102 of FIG. 1, corresponding to a number of measured locations. Example media request information includes the device types of media presentation device(s) (e.g., the media presentation devices 104-116 of FIG. 1) determined by respective ones of the media presentation devices. As described above, the example media presentation device identifier 102 determines the media request information from evaluation of source identifications in network-bound messages from the media presentation devices 104-116 to content host(s) 122. In some examples, the media request information further includes any of the source identifications, timestamps of media requests, and/or request destinations.

The example device usage processor 404 processes the device types from the media request information to determine usage information (block 804). Example usage information may include an aggregation of media requests for particular type(s) of media presentation device(s), particular User-Agent(s), particular request destination(s), and/or for particular time period(s). Example usage information is illustrated in the table 500 of FIG. 5. Example instructions to implement block 804 are illustrated in FIG. 9. After block 804, the example instructions 800 may end and/or iterate to determine additional or alternative usage information. The instructions 800 of FIG. 8 may be initiated by, for example, user inputs indicating parameters to be used (e.g., a time period of interest) in developing the usage information.

FIG. 9 is a flowchart representative of example machine readable instructions 900 which may be executed to implement the example data collection system 124 of FIG. 4 to process device types. The example instructions 900 may additionally or alternatively be used to implement the example usage tracker 216 of FIG. 2 to determine usage statistics and/or media presentation information. The example instructions 900 may be used to implement block 804 of FIG. 8 to process device types.

The example instructions 900 of FIG. 9 begin by aggregating (e.g., via the device usage processor 404 of FIG. 4) media requests by device type (block 902). For example, the device usage processor 404 may determine the total number of media requests for each device type and/or for each User-Agent (or other source identification) within a particular time period of interest. The device usage processor 404 may additionally or alternatively aggregate the media requests using other media request information.

The example device usage processor 404 determines whether the media requests include request destinations (block 904). For example, the media presentation device identifier 102 of FIG. 1 determines that at least some of the media requests from the media presentation devices 104-116 are directed to the content host 122 of FIG. 1 and stores media request entries to the example data collection system 124 that include the request destinations. If the media requests include request destination(s) (block 904), the example device usage processor 404 aggregates the media requests by device type and by request destination (block 906). An example aggregation of media requests by device type 514 and by request destination 518 is illustrated in the table 500 of FIG. 5.

If the example media requests do not include request destinations (block 904), or after aggregating media requests by device type and request destination (block 906), the example device usage processor 404 ranks the device types by usage (e.g., by time period 520 of FIG. 5) (block 908). As illustrated in FIG. 5, the example usage information 502-512 includes the usage per time period 520. The example device usage processor 404 may combine the device types (e.g., not split the device types by request destination 518 nor any other division), add the usage per time period 520 for each of the device types 514, and rank the usage information by the total usage per time period 520 of each device.

The example device usage processor 404 also ranks the device types by ownership (block 910). For example, the device usage processor 404 determines the ownership of each of the device types 514 in the usage information 502-512 of FIG. 5 by assigning a unique identifier value to media requests for each media presentation device as identified by each media presentation device identifier from which media requests are received. As an example, media requests corresponding to a game console identified by a first media presentation device identifier may be given an identifier UID001010 and media requests corresponding to a tablet computer identified by the first media presentation device identifier may be given an identifier UID002020, while media requests corresponding to the same type of game console identified by a second media presentation device identifier may be given an identifier UID003030 and media requests corresponding to a personal computer identified by the second media presentation device identifier may be given an identifier UID004040. As a result, the device usage processor 404 determines that there are two separate game consoles present in the monitored locations. In some examples, the media presentation device identifier 102 distinguishes between multiple ones of the media presentation devices 104-116 having the same device type (e.g., multiple game consoles 108 of the same model) by evaluating a different level of the communication (e.g., a different layer of the 7-layer Open Systems Interconnection (OSI) Model) of which the HTTP message is a part (e.g., to determine an originating IP address or other characteristic of a message).

The device usage processor 404 determines whether a type or types of media exposure are specified (block 912). For example, type(s) of media exposure and/or usage may be specified by a user requesting a report of media presentation device usage. The type(s) of media exposure and/or usage may be general such as audio and/or video, and/or may be more specific such as media content requested from a specified content host. If type(s) of media exposure and/or usage have been specified (block 912), the example device usage processor 404 ranks device types for the specified type(s) of media exposure and/or usage (block 914). For example, the device usage processor 404 aggregates the usage information 502-512 of FIG. 5 by device type 514 and by the specified type of media exposure and/or usage. If a user has specified the type of media exposure and/or usage to be video, the example device usage processor 404 aggregates the media requests by device type 514 and combines the usage information having a request destination 518 (or other field) falling under the video category.

After ranking the device types for the specified type(s) of media exposure and/or usage (block 914), or if no type(s) of media exposure and/or usage were specified (block 912), the example report generator 406 generates report(s) of usage information (block 916). The example usage information report(s) are based on the aggregated media requests by device type and request destination (block 906), the device type usage ranks (block 908), the device type ownership ranks (block 910), and/or the device type ranks for specified type(s) of media exposure and/or usage (block 914). The example report generator 406 generates a table similar to the table 500 of FIG. 5 to report the usage information, but may additionally or alternatively generate tables having different formats and/or different contents than the table 500. The report generator 406 may store the usage information report(s) in the example usage information database 408 and/or provide the report(s) to a requesting user. The example instructions 900 then end and/or iterate to continue processing device types.

Figure 10:
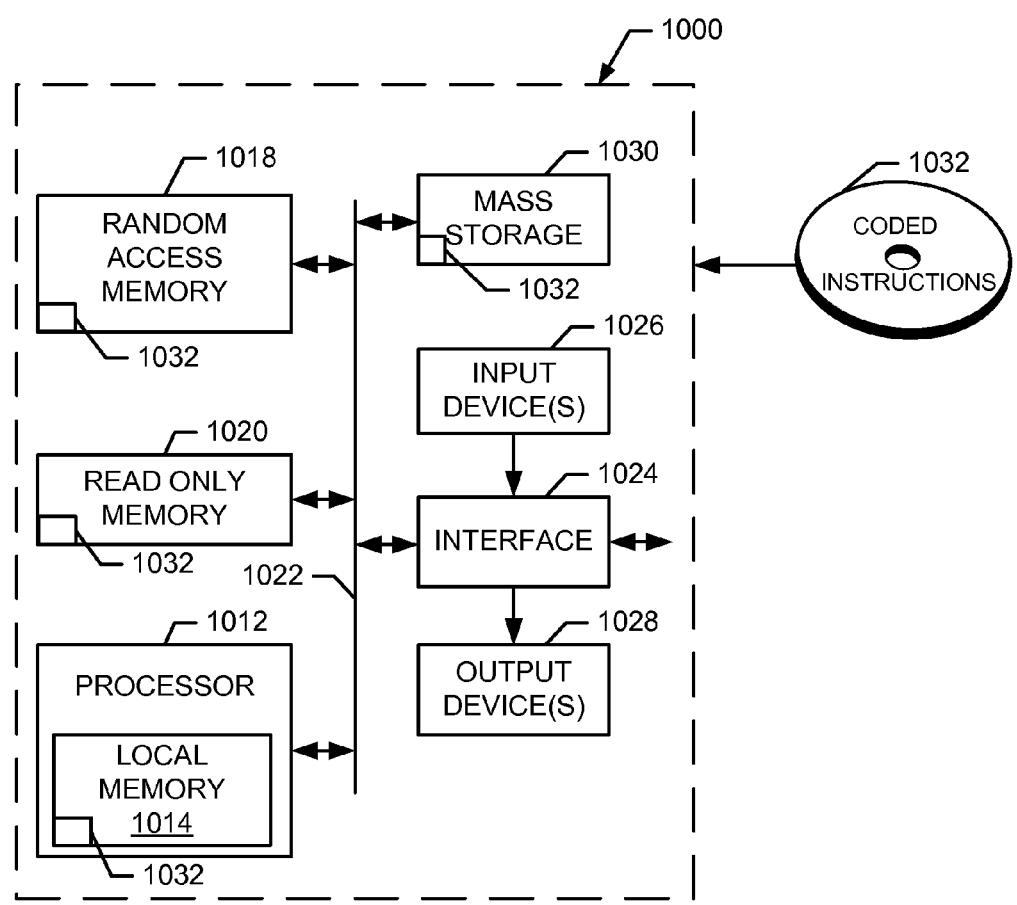
FIG. 10 is a block diagram of an example processor platform capable of executing the instructions of FIGS. 6-9 to implement the media presentation device identifier of FIGS. 1 and 2 or the example data collection systems of FIGS. 1 and 4.

FIG. 10 is a block diagram of an example processor system 1000 that may execute, for example, the machine-readable instructions of FIGS. 6-9 to implement the example media presentation device identifier 200 of FIGS. 1 and 2 and/or the example data processing system 124 of FIGS. 1 and 4. The processor system 1000 can be, for example, a server, a personal computer, an internet appliance, a router, an Internet gateway device, a modem, an audience measurement device, and/or any other type of computing device.

The processor system 1000 of the instant example includes a processor 1012. For example, the processor 1012 can be implemented by one or more Intel® microprocessors. Of course, other processors from other entities are also appropriate. The example processor 1012 includes a local memory 1014.

The processor 1012 is in communication with a main memory including a volatile memory 1018 and a non-volatile memory 1020 via a bus 1022. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory is typically controlled by a memory controller (not shown).

The processor system 1000 also includes an interface circuit 1024. The interface circuit 1024 may be implemented by any type of interface standard, such as an Ethernet interface, a universal serial bus (USB), and/or a PCI express interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device (e.g., the local network interface 202, the WAN interface 206) such as a modem or network interface card to facilitate exchange of data with external processor systems via a network (e.g., an Ethernet connection, a digital subscriber line (DSL), a telephone line, coaxial cable, a cellular telephone system, a Bluetooth connection, etc.).

The processor system 1000 also includes one or more mass storage devices 1030 for storing software and data. Examples of such mass storage devices 1030 include floppy disk drives, hard drive disks, compact disk drives, and digital versatile disk (DVD) drives. The mass storage device 1030 may implement the example source identification storage 208 of FIG. 2 and/or the usage information database 408 of FIG. 4.

The coded instructions 1032 of FIGS. 6-9 may be stored in the mass storage device 1030, in the volatile memory 1018, in the non-volatile memory 1020, in the local memory 1014, and/or on a removable storage medium such as a CD or DVD.

From the foregoing, it will be appreciated that methods, apparatus and/or articles of manufacture disclosed herein may be used to measure usage information for media presentation devices at measured locations. This usage information enables more complete information to be collected for audience measurement (e.g., television usage, radio usage, on-demand programming usage, etc.), as the usage information identifies activities taking place when an audience member is not performing activities that are measurable using known systems. Further, example methods, apparatus, and/or articles of manufacture disclosed herein are easily updated to recognize new devices and/or different versions of devices shortly after (or, in some cases, even before) the devices are introduced into consumer usage.

Example methods, apparatus, and/or articles of manufacture disclosed herein are also used to aggregate media presentation device information, which can be useful to manufacturers and advertisers to determine which features should be improved, determine which features are popular among users, identify geodemographic trends with respect to media presentation devices, identify market opportunities, and/or otherwise evaluate their own and/or their competitors' products.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to identify a media presentation device, comprising:
    intercepting, using a processor in communication with a local network, an outbound data packet including a source identification, the source identification being a User-Agent field in the HTTP protocol, and the outbound data packet being addressed to a destination in a wide area network and originating from a media presentation device in the local network;
    identifying, with the processor, a device type of the media presentation device based on the source identification;
    monitoring, with the processor, for an inbound data packet destined for the media presentation device, the inbound data packet representing a response to the outbound data packet;
    identifying, with the processor, media presentation information based on the inbound data packet;
    storing the device type and an indication of media exposure; and
    storing the media presentation information in association with the device type.

2. A method as defined in claim 1, wherein identifying the device type includes comparing the source identification to a source identification database.

3. A method as defined in claim 1, further including identifying a first source identification as having a same device type as a second source identification different than the first source identification.

4. A method to identify a media presentation device comprising:
    intercepting, using a processor in communication with a local network, an outbound data packet including a source identification, the outbound data packet being addressed to a destination in a wide area network and originating from a media presentation device in the local network;
    storing, with the processor, a media request entry including a request origin and a request destination based on the outbound data packet;
        determining, with the processor, whether an inbound data packet corresponds to the media request entry by determining whether at least one of an origin of the inbound data packet or a destination of the inbound data packet corresponds to the request origin or the request destination; and
        identifying, with the processor, a device type of the media presentation device based on the source identification;
    storing the device type and an indication of media exposure; and
    storing information representative of the inbound data packet when the inbound data packet corresponds to the media request entry.

5. An apparatus, comprising:
    a local network interface to intercept an outbound data packet originating from a media presentation device in a local network and addressed to a destination in a wide area network, the outbound data packet including a source identification and a request, the source identification including a User-Agent string in the HTTP protocol;
    a source identifier to monitor for an inbound data packet destined for the media presentation device, the inbound data packet representing a response to the outbound data packet, and the source identifier to identify a device type of the media presentation device based on the source identification;
    a usage tracker to identify media presentation information based on the inbound data packet; and
    a database to store the device type and an indication of media exposure and to store the media presentation information in association with the device type, wherein at least one of the local network interface, the usage tracker, the database, or the source identifier is implemented using a logic circuit.

6. An apparatus as defined in claim 5, further including a wide-area network interface to forward the outbound data packet to the wide area network and to receive the inbound message data packet including media requested in the request, wherein the local network interface is to forward the inbound data packet to the media presentation device.

7. An apparatus as defined in claim 5, further including a source identification database to store a plurality of reference source identifications, the source identifier to compare the source identification to at least one of the plurality of reference source identifications to identify the device type.

8. An apparatus as defined in claim 5, wherein the source identifier includes:
   a message parser to identify contents of the source identification; and
   a device identifier to identify a device based on the contents.

9. An apparatus as defined in claim 8, wherein the message parser is to identify media based on auxiliary data included in the outbound data packet, and the database is to store the media identification in association with the device type.

10. An apparatus as defined in claim 5, wherein the source identifier further includes a message comparer to compare the outbound data packet to the inbound data packet to associate the inbound data packet with the media presentation device.

11. An apparatus as defined in claim 5, wherein the usage tracker is to generate the media presentation information based on a plurality of media requests.

12. A tangible computer readable medium comprising computer readable instructions, which, when executed, cause a processor to at least:
   intercept an outbound data packet including a source identification, the source identification being a User-Agent field in the HTTP protocol, and the outbound data packet being addressed to a destination in a wide area network and originating from a media presentation device in a local network;
   identify a device type of the media presentation device based on the source identification;
   monitor for an inbound data packet destined for the media presentation device, the inbound data packet representing a response to the outbound data packet;
   identify media presentation information based on the inbound data packet;
   store the device type and an indication of media exposure; and store the media presentation information in association with the device type.

13. A computer readable medium as defined in claim 12, wherein the instructions cause the processor to upload the device type to a data collector to determine media presentation device usage statistics.

14. A computer readable medium as defined in claim 12, wherein the instructions are to cause the processor to identify the device type by comparing the source identification to a source identification database.

15. A tangible computer readable medium comprising computer readable instructions which, when executed, cause a processor to at least:
   intercept an outbound data packet including a source identification, the outbound data packet being addressed to a destination in a wide area network and originating from a media presentation device in a local network;
   store a media request entry including a request origin and a request destination based on the outbound data packet; and
   determine whether an inbound data packet corresponds to the media request entry by determining whether at least one of an origin of the inbound data packet or a destination of the inbound data packet corresponds to the request origin or the request destination;
   store the device type and an indication of media exposure; and
   store information representative of the inbound data packet when the inbound data packet corresponds to the media request entry.

16. An apparatus, comprising:
   a local network interface to intercept an outbound data packet originating from a media presentation device in a local network and addressed to a destination in a wide area network, the outbound data packet including a source identification and a request;
   a database to store a media request entry including a request origin and a request destination based on the outbound data packet;
   a message comparer to determine whether an inbound data packet corresponds to the media request entry by determining whether at least one of an origin of the inbound data packet or a destination of the inbound data packet corresponds to the request origin or the request destination; and
   a source identifier to identify a device type of the media presentation device based on the source identification, the database to store the device type and an indication of media exposure, and the database to store information representative of the inbound data packet when the inbound data packet corresponds to the media request entry, wherein at least one of the local network interface, the database, the message comparer, or the source identifier is implemented using a logic circuit.

17. An apparatus as defined in claim 16, wherein the source identification includes a User-Agent string representative of the device type.

* * * * *

UNITED STATES PATENT AND TRADEMARK OFFICE
CERTIFICATE OF CORRECTION

PATENT NO. : 9,124,920 B2
APPLICATION NO. : 13/172550
DATED : September 1, 2015
INVENTOR(S) : Jan Besehanic Page 1 of 1

It is certified that error appears in the above-identified patent and that said Letters Patent is hereby corrected as shown below:

On the title page, in item 73 Assignee: delete "Nielson" and insert --Nielsen-- between "THE" and "COMPANY"

Signed and Sealed this
Seventh Day of June, 2016

Michelle K. Lee
*Director of the United States Patent and Trademark Office*